United States Patent [19]
Rankin

[11] Patent Number: 5,681,022
[45] Date of Patent: Oct. 28, 1997

[54] CLAMPING DEVICE

[76] Inventor: Noel William George Rankin, 17 Gatwick Road, Bayswater, Victoria, Australia, 3153

[21] Appl. No.: 360,751

[22] PCT Filed: Dec. 22, 1992

[86] PCT No.: PCT/AU92/00679

§ 371 Date: Jan. 19, 1995

§ 102(e) Date: Jan. 19, 1995

[87] PCT Pub. No.: WO94/00374

PCT Pub. Date: Jan. 6, 1994

[30] Foreign Application Priority Data

Jun. 26, 1992 [AU] Australia ............................ PL3167
Nov. 25, 1992 [AU] Australia ............................ PL6001

[51] Int. Cl.⁶ ............................................ A45D 42/14
[52] U.S. Cl. ............................ 248/363; 248/362; 248/205.9
[58] Field of Search ................................. 248/363, 362, 248/205.7, 205.8, 205.9, 674, 676, 125.1, 669; 294/64.1, 65

[56] References Cited

U.S. PATENT DOCUMENTS

| | | | |
|---|---|---|---|
| 2,133,518 | 10/1938 | Huebner | 248/363 |
| 2,852,264 | 9/1958 | Granata . | |
| 2,853,333 | 9/1958 | Littell . | |
| 3,028,131 | 4/1962 | Beck | 248/362 |
| 3,055,694 | 9/1962 | Billner | 294/65 |
| 3,126,192 | 3/1964 | Stein | 248/362 |
| 3,640,562 | 2/1972 | Creskoff . | |
| 3,677,598 | 7/1972 | Becker | 294/64.1 |
| 4,951,911 | 8/1990 | Zatopek | 248/362 |
| 5,429,333 | 7/1995 | Klein | 248/205.9 |

FOREIGN PATENT DOCUMENTS

| | | |
|---|---|---|
| 29280/67 | 5/1969 | Australia . |
| 1138249 | 6/1957 | France . |

OTHER PUBLICATIONS

Derwent Abstract Accession No. J53108/40, class Q38, SU A, 640952 (Konovalov) Jan. 10, 1979 (Jan. 10, 1979) abstract and figure.

Derwent Soviet Inventions Illustrated, Section III, Mechanical & General, Issued May 1969, Building, Mining, Mechanical Handling p.4,SU 219145 (Tarasov et al) Mar. 1969 (Mar. 1969).

Derwent Soviet Inventions Illustrated, Section III, Mechanical & General, Issued Feb. 1965, General Engineering, p. 6, SU 163736 (Levin) Dec. 1964 (Dec. 1964) abstract and figure To Follow.

*Primary Examiner*—Ramon O. Ramirez
*Assistant Examiner*—Gwendolyn W. Baxter
*Attorney, Agent, or Firm*—Richard M. Goldberg

[57] ABSTRACT

A clamping device (2) adapted to be used to grasp an article or to clamp a tool to a workpiece, comprising: (a) a substantially flat or curved vacuum chamber (21) having a lower surface contained or comprised in a vacuum body (14, 15); (b) a compressible seal (18) located at or adjacent the perimeter of the vacuum body, the compressible seal being located in a groove (19) in the vacuum body, the groove being so dimensioned that the compressible seal, when pressed against an article or workpiece, expands and/or moves into a space in the groove thus stabilizing the position of the compressible seal and improving its airtight qualities; and (c) a source of vacuum (23) for connection to the vacuum chamber.

8 Claims, 6 Drawing Sheets

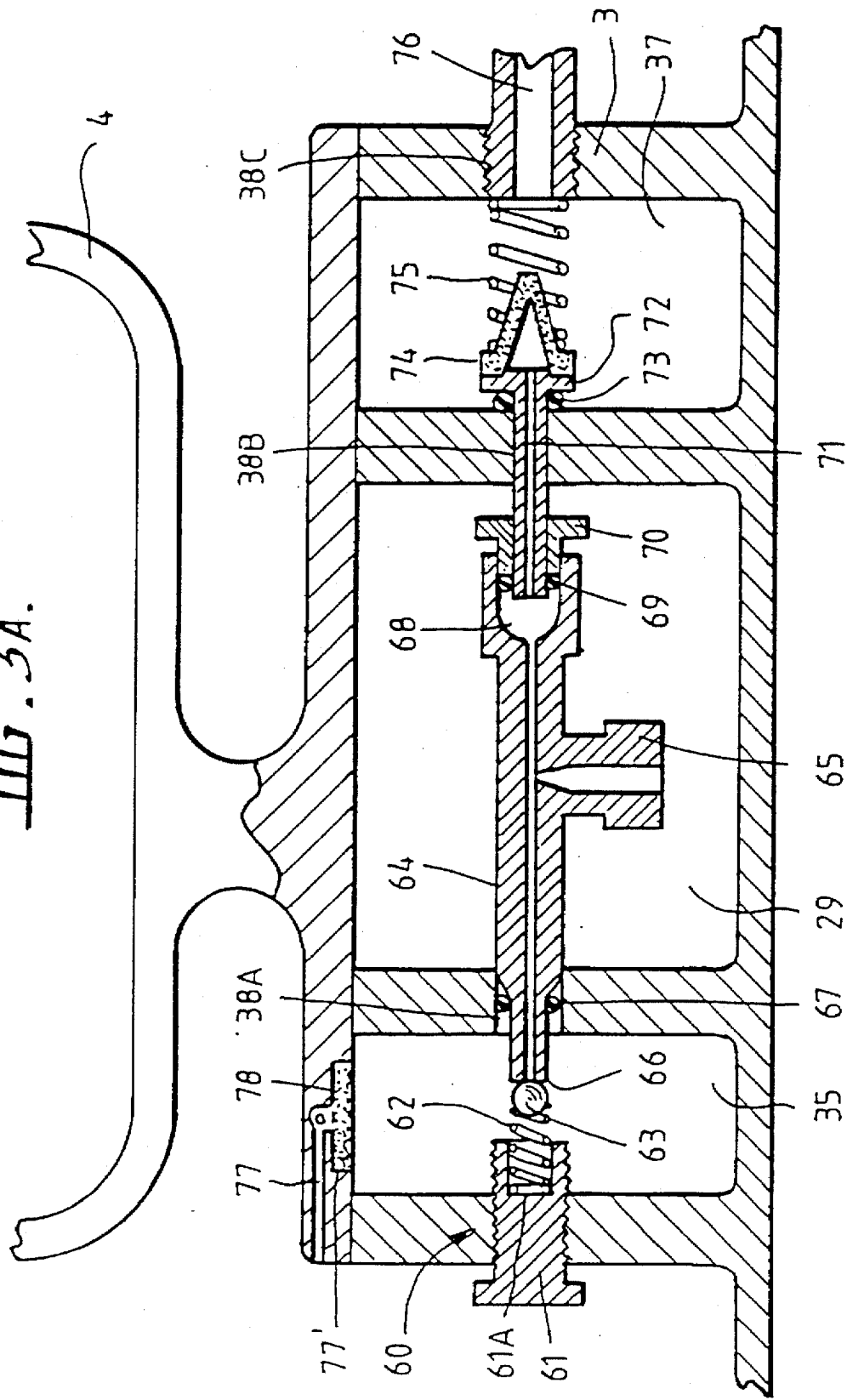

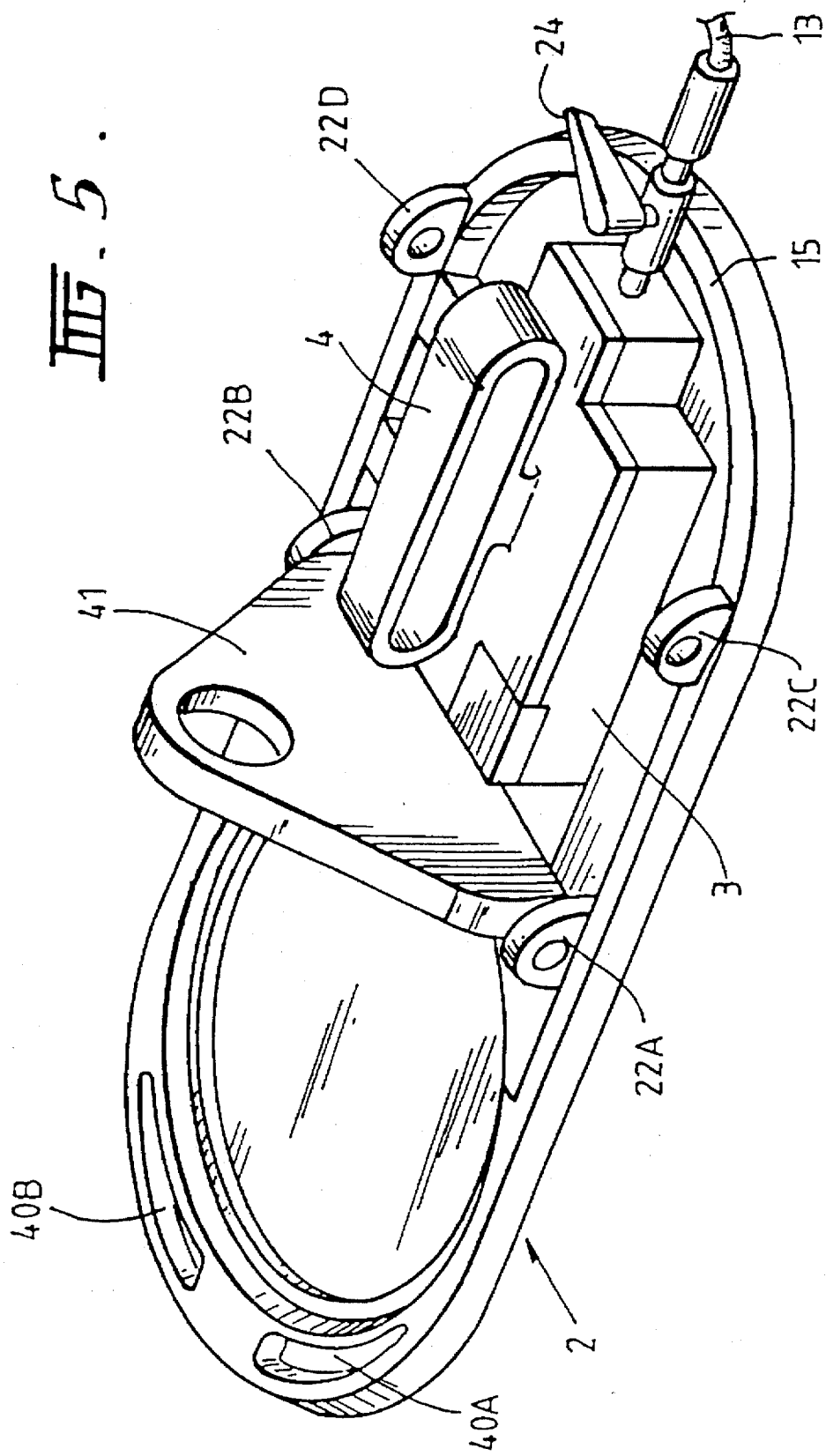

CLAMPING DEVICE

FIELD OF THE INVENTION

This invention relates to a clamping device and in particular to a clamping device which may be used to grasp an article or to clamp a tool to a workpiece.

BACKGROUND OF THE INVENTION

Suction pads and similar devices are known for grasping articles, for example, to transport an article from one position to another. They are also used for such purposes as attaching a tool to a workpiece. Suction pads tend to gradually lose their "vacuum" and become detached from the article to be grasped or the workpiece. It is possible to overcome this problem by providing continuous suction to a variant of a suction pad.

Australian patent specification No. 274586 Woodfield Bennett Limited discloses a pick up head comprising a back plate provided with a soft rubber seal positioned on the underneath of the plate. Australian patent specification No. 29280/67 Vacu-Lift Maschinenbau GmbH also discloses an annular sealing ring, which in this case has a support. The annular sealing ring surrounds a vacuum chamber. Australian patent specification No. 71603/74 "Othene" International Handelmaatschappij BV discloses a suction-cup construction comprising a vacuum chamber having an elastic sealing strip affixed to the periphery of the bottom of the vacuum chamber. In none of these instances is the seal located in a groove as defined in the present invention.

It is an object of the present invention to provide an improved clamping device which makes use of continuous or intermittent suction from a "vacuum" space.

In this specification, the word "vacuum" is used in a relatively loose sense to indicate a low pressure relative to atmospheric pressure such that a clamping device according to the invention will be held to an article to be grasped and/or lifted or clamped to a workpiece.

It is a further object of this invention to provide an assembly of an improved clamping device according to the invention and a tool for working upon a workpiece.

BRIEF SUMMARY OF THE INVENTION

This invention, therefore, provides a clamping device adapted to be used to grasp an article or to clamp a tool to a workpiece, which comprises:
1. a substantially flat or curved vacuum chamber having a lower surface contained or comprised in a vacuum body;
2. a compressible seal located at or adjacent the periphery of the vacuum body, the compressible seal being located in a groove in the vacuum body, the groove being so dimensioned that the compressible seal, when pressed against an article or workpiece, expands and/or moves into a space in the groove thus stabilising the position of the compressible seal and improving its airtight qualities; and
3. a means to supply a vacuum to the vacuum chamber.

This invention further provides an assembly of an improved clamping device according to the invention and as defined above, in combination with a tool attached to the structure of the clamping device and so located that it may be operated to perform work operations on an article or workpiece.

BRIEF DESCRIPTION OF THE DRAWINGS

The drawings illustrate one embodiment of the invention by way of example in which:

FIG. 1A is a detail in cross-section of a seal forming part of the clamping device according to the invention;

FIG. 1B is a detail of the seal of FIG. 1A, the clamping device being in use;

FIG. 3A is a cross-sectional view of internal mechanism of the assembly taken along line A—A in FIG. 3;

FIG. 5 is a perspective view of a lifting tool according to the invention.

DETAILED DESCRIPTION OF THE INVENTION

Figure 1:
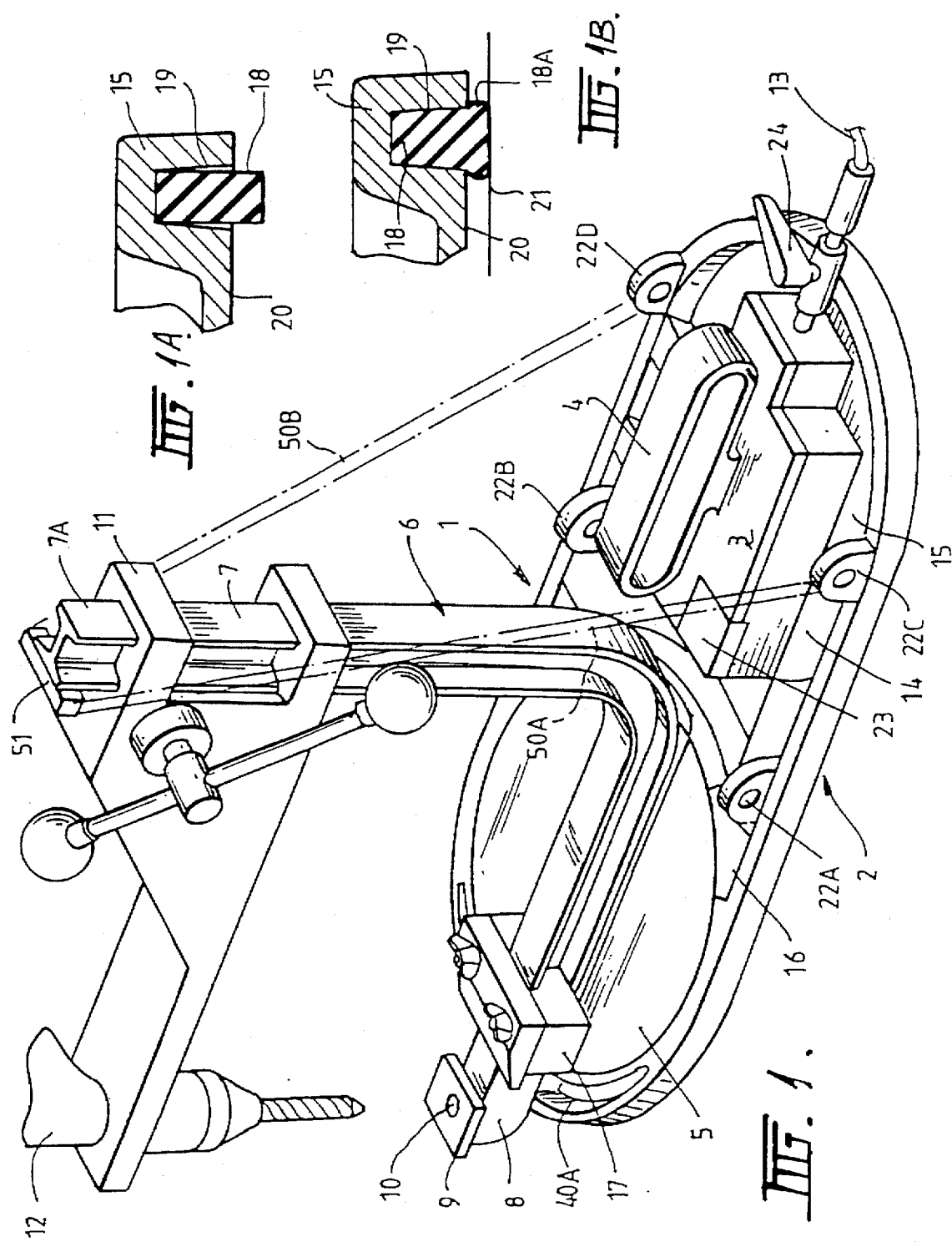
FIG. 1 is a perspective view of an assembly as defined above.

Although the lower surface of the vacuum body (as seen in use) is preferably substantially flat to enable the body to adhere to an article or workpiece with a corresponding relatively flat surface, it is possible to have a curved vacuum body so that the body may adhere to an article or workpiece with a correspondingly curved surface. Furthermore the body may be provided with a degree of flexibility such that it may be flexed and/or manipulated to adhere to a curved or relatively irregular surface.

The lower surface of the vacuum body may be provided with at least one and preferably a pattern of internal protrusions elevated to a relatively slight degree from the lower surface wherein in use the size of the vacuum chamber and the degree of vacuum produced may be selected. In this way the adherence of the clamping device to the surface or article to be clamped or grasped may be improved. In addition a peripheral protrusion may also be provided, located outside the line of the seal, and acting to stabilise the operation of the vacuum body by avoiding unwanted rotation of the vacuum body toward or away from the surface or article, particularly when an attached tool such as a drill commences operation on the surface or article. This peripheral protrusion may completely surround the lower surface of the vacuum body, in which case the internal protrusions may not be necessary. Alternatively, it may be provided in a peripheral portion or portions, for example, located under that part of the vacuum body remote from an attached tool.

The compressible seal is preferably constructed principally from a compressible, flexible material made from a polymeric material, such as a natural rubber or an artificial rubber. As stated previously, it is essential that the compressible seal be located in a groove which is so dimensioned that the seal, when under compression, will expand to fill any free space in the groove, thus providing stability and air-tightness. In addition, the fact that the seal can at least partly move from outside to the inside of the groove assists in conforming the seal to roughnesses on the surface. The groove is, for example, of square or rectangular cross-section with a substantially flat bottom. The seal may be adhered to the bottom of the groove or the groove may be so shaped that it clamps the end of the seal. Of course, the groove may have a curved bottom and the seal may be adhered to that bottom.

The source of vacuum may be any suitable pump or other device designed to evacuate air. Thus, the source of vacuum may be separate from the clamping device according to the invention, for example, it may be a suction pump mounted separately. Alternatively, the vacuum chamber may be mounted in a housing attached to the clamping device and a means to evacuate air may be in turn mounted in that housing. Thus, the device to evacuate air may be a venturi pump in which a flow of air through a venturi tube is used to suck air through an offset evacuating tube leading to the vacuum chamber. In this embodiment a two-way valve may be included; thus, in a first position of the valve, air is evacuated from the vacuum chamber as described and, in a second position of the valve, air is directed to the vacuum chamber to overcome the vacuum and release the device from the article or workpiece. Furthermore, a check valve may be provided wherein, in a first operative position of the check valve, a flow of air is allowed to pass to the atmosphere and, in a second operative position, where an external source of vacuum is used, entry of air into the housing and thence to the vacuum chamber is prevented.

In the embodiment of the invention just described, a clamping device may be mounted on the housing, for example, on a turntable. A tool may be connected to the clamping device, for example, a drill. Thus the clamping device and tool may be so located on the housing itself or the turntable that it may be used to operate on a workpiece, for example, to drill holes. It is a particular advantage of this embodiment of the invention that a tool may be used to perform operations on awkwardly located workpieces, for example, the structural members of buildings, reducing the physical strain on the operator.

The clamping device according to the invention may also be used as a lifting device for objects having surfaces of various roughness or irregularity and porosities. For example, it may be used to lift objects of metal or even concrete where the surface is not smooth and the concrete may have a relatively substantial porosity.

Turning to the accompanying drawings, numeral 1 indicates an assembly according to the invention, a clamping device 2 is provided with a vacuum source housing 3 to which is attached a handle 4 to position the assembly. At the other end of clamping device 2 is a turntable 5 used to locate a generally L-shaped supporting arm 6 having an upright portion 7 and a horizontal portion 8. At one end of horizontal portion 8 is a plate means 9 normally used to provide a surface against which a tool (in the present case a drill; see below) may be worked. A hole 10 is indicated generally in the centre of plate 9; the hole actually penetrating the end of horizontal portion 8. A movable locating means 11 is positioned on upright portion 7 and is used to support and locate drill 12.

Considering FIG. 1 in more detail, an air-supply (or suction) hose 13 is shown connected to housing 3. Clamping device 2 has a base portion 14 around the perimeter of which is located an upwardly extending rim 15, the purpose of which will be explained. A locking means 16 is located adjacent the perimeter of turntable 5 to lock the turntable in position. (Another locking means is provided in a corresponding position on the other side of the turntable). A boss means indicated generally by numeral 17 is attached to turntable 5 (in the present case shown as being adjacent to the end of clamping device 2 distal from housing 3) and is adapted to locate and hold in position supporting arm 6.

Two lifting lugs 22A and 22B respectively are shown positioned towards the sides of clamping device 2 on top of rim 15. These lugs may be used to attach a safety line or harness. Numeral 23 indicates a quick release means to allow air into the suction portion of clamping device 2.

Numeral 24 indicates an inlet-tap for compressed air or an inert gas or to shut off a suction means.

Two more lugs 22C and 22D respectively are located towards the sides of clamping device 2 on top of rim 15 and near that end of the clamping device adjacent the vacuum source. A first strut 50A extends from lug 22C to pad 51 positioned behind top 7A of upright portion 7 of supporting arm 6. A second strut 50B extends from lug 22D to pad 51, both struts being included for extra strength and stability of assembly 1.

Turning now to FIGS. 1A and 1B, upwardly extending rim 15 houses lower circumferential groove 19 which in turn houses compressible seal 18. Groove 19 is shown as very slightly tapered to grip seal 18. FIG. 1A shows seal 18 in its inoperative condition whereas FIG. 1B shows seal 18 squashed into groove 19 with bulging portion 18A squashed outwards and into contact with vacuum chamber base 20 and a surface 21.

Figure 2:
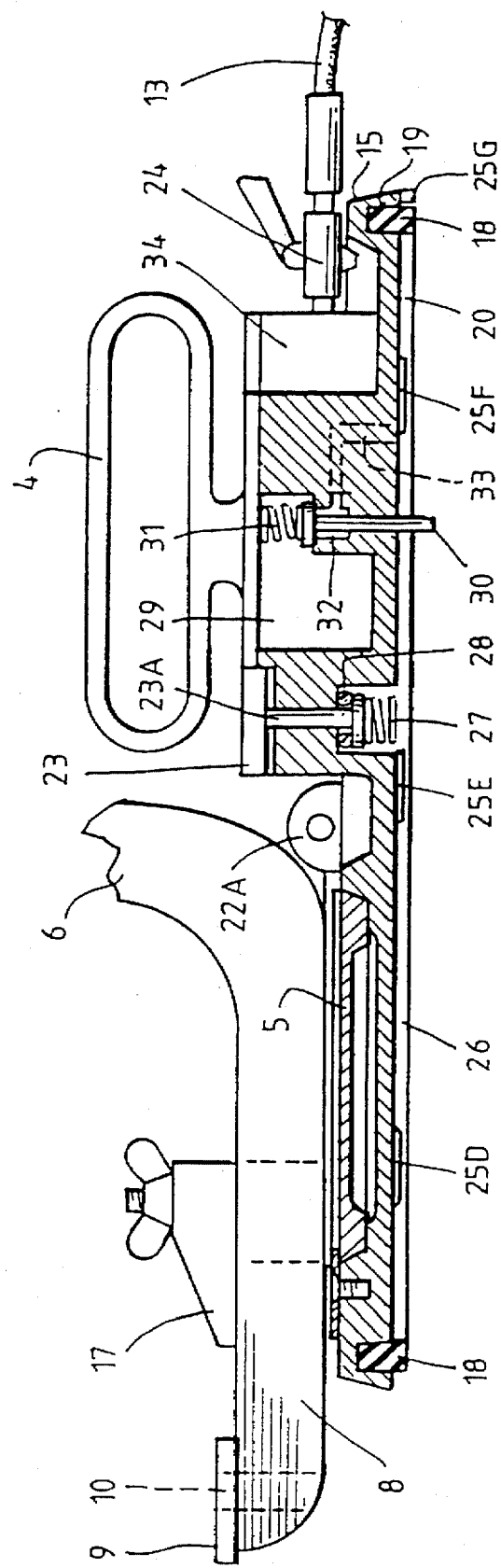
FIG. 2 is a cross-sectional view of a clamping device according to the invention.

Turning to FIG. 2, like numerals indicate like integers. Numeral 23A indicates a valve means forming part of quick release means 23 and which operates as explained below. Numeral 25D indicates a downward protrusion from base 20. (Three protrusions are shown; see also FIG. 4.) A downward, peripheral protrusion 25G is indicated below rim 15 adjacent the inlet for supply hose 13. A vacuum chamber 26 having an open bottom and a roof formed by base 20 is also shown.

Returning to the detail of quick release means 23, valve means 23A is compressed by a spring 27 upwards against O-ring 28 which normally prevents entrance of air into the vacuum chamber 26 when in use.

Figure 3:
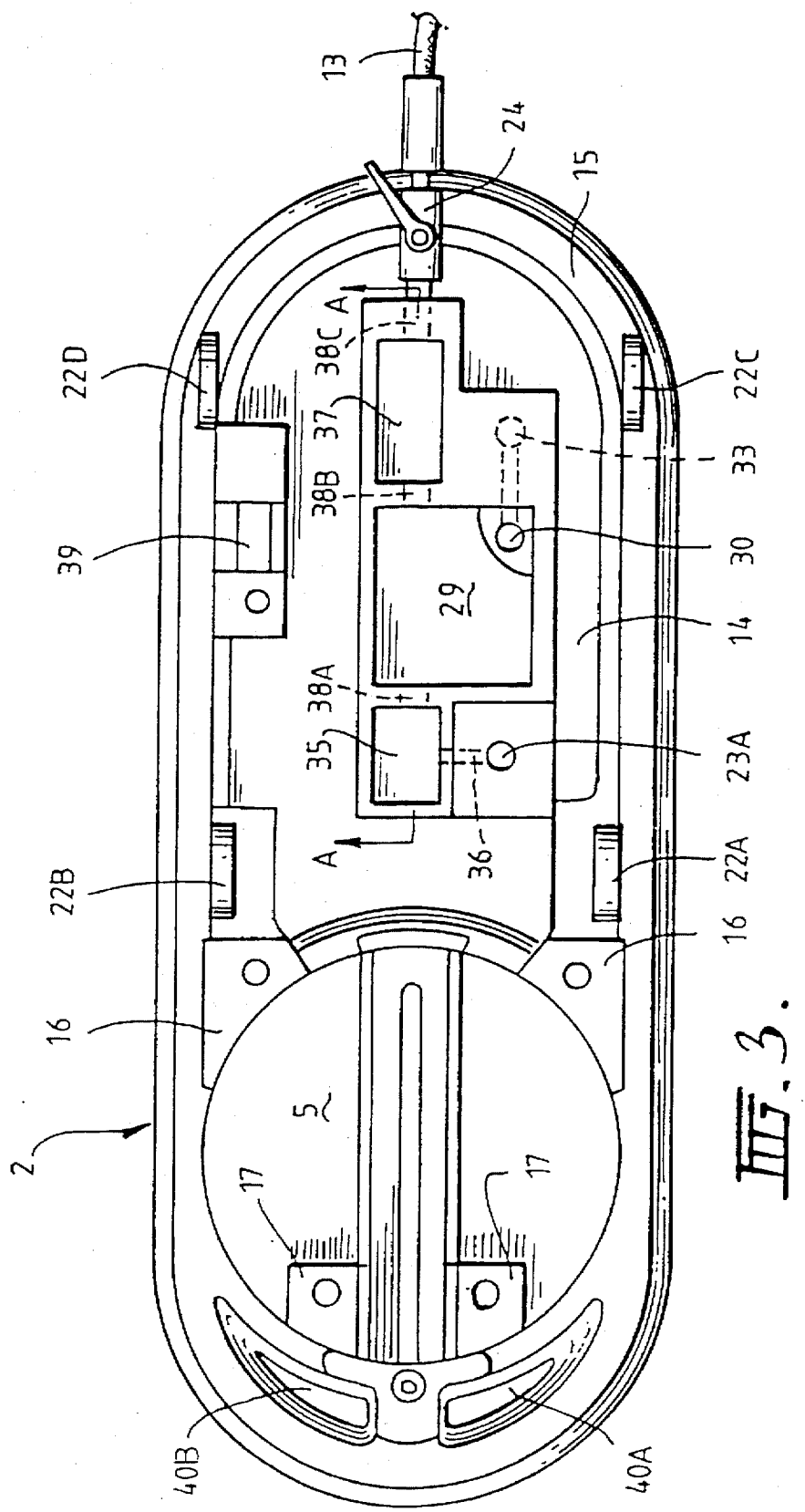
FIG. 3 is a plan view of a lower portion of the assembly of FIG. 1.

Numeral 29 indicates a vacuum cavity housing a venturi device (details of which are shown in FIG. 3A). Valve 30 is forced downwards by spring 31 to seal entrance 32 leading to channel 33 which exits into vacuum chamber 26 thus producing a vacuum therein. In the inoperative state of clamping device 2, the stem of valve 30 protrudes below base 20. Numeral 34, indicating an unhatched portion FIG. 3, is merely a cutaway portion of housing 2, as can be seen from FIG. 1.

With regard to FIG. 3, numeral 35 indicates an air silencer chamber leading by conduit 36 to valve device 23A whereby compressed air may be diverted into the vacuum chamber 26 to release clamping device 2. Numerals 38A, 38B and 38C indicate conduits between silencer chamber 35 and vacuum chamber 29; vacuum chamber 29 and air filter chamber 37; and air filter chamber 37 and tap 24 respectively. In the case where air or an inert gas is used to create a vacuum, the air or gas exhausts from air silencer chamber 35. A simple vacuum indicator connected to vacuum chamber 26 is indicated by numeral 39. Numerals 40A and 40B indicate two depressions formed in the principal portion of the casting comprising clamping device 2 to decrease weight.

FIG. 3A provides details of the mechanism as viewed in cross-section along line A—A shown in FIG. 3. Numeral 60 indicates a check valve comprising an adjustable body portion 61 and is provided with a hollowed end portion 61A and extends into silencer chamber 35. A first spiral spring means 62 fits into hollowed end portion 61A and bears upon sealing means 63. A venturi device 64 provided with an inner longitudinal hole, and a side body 65, provided with a narrowing venturi hole, extends between silencer chamber 35 and vacuum cavity 29. Sealing means 63 bears against end 66 of venturi device 64, in one operative position. A first O-ring 67 located in conduit 38A seals silencer chamber 35 from vacuum chamber 29.

The end of venturi device 64 distal from end 66 is provided with an opened-out portion 68 into which is fitted a second O-ring 69 located adjacent a sleeve means 70. This sleeve means 70 locates a connecting means 71, provided with an inner longitudinal hole, within opened-out portion 68 and extends through conduit 38B to air filter chamber 37. The connecting means 71 ends in flanged portion 72. A third O-ring 73 is located between flanged portion 72 and the adjacent wall of air filter chamber 37.

A generally conical first air filter means 74 bears against flanged portion 72. A second spiral spring means 75 bears against the inlet wall of air filter chamber 37, holding conical filter means 74 in position. An inlet 76 is indicated leading into air filter chamber 37.

An outlet 77 leads out of silencer chamber 35 and is provided with a concentric cavity 77 adjacent the silencer chamber. A second air filter means 78 is located within cavity 77 and functions as a silencer.

Check valve 60 may be adjusted to a first operative position, in which air or gas is allowed to escape into the silencer chamber 35, and to a second operative position, in which a suction device removes air through inlet 76, air being prevented from entering the vacuum chamber 26 from silencer chamber 35.

Figure 4:
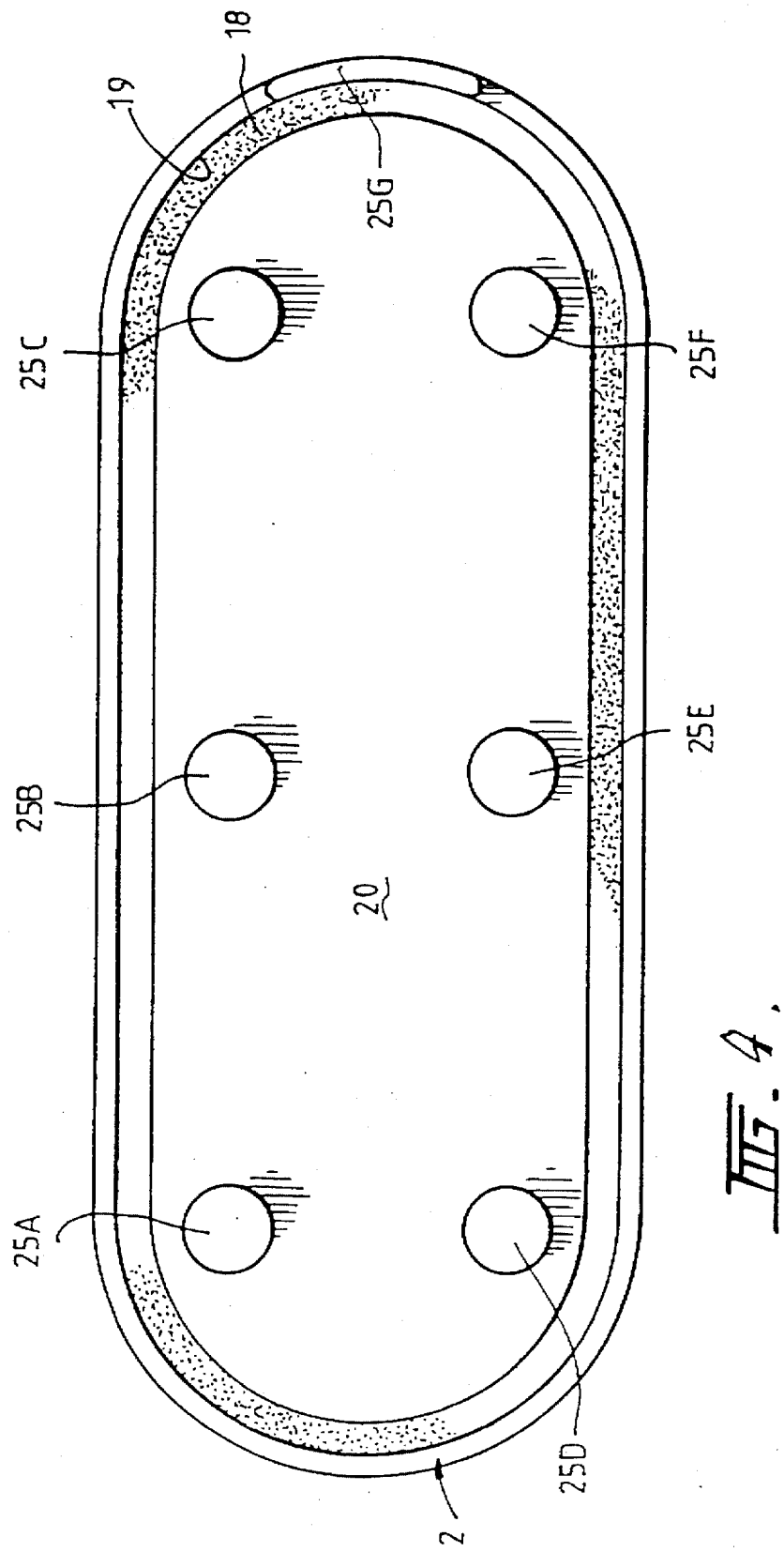
FIG. 4 is a plan view from the bottom of the lower portion of the assembly shown in FIG. 3.

Regarding FIG. 4, an array of downward protrusions 25A to 25F inclusive is shown in the base 20 of vacuum chamber 26. The downward protrusion 25G, already described above, is also shown at the lower outward periphery of rim 15. These protrusions limit the contraction of seal 18, permit formation of a more effective vacuum and generally stabilise clamping device 2.

FIG. 5 relates to a lifting device in which the turntable 5 and tool, for example, drill 12, have been eliminated, as have lifting lugs 22A and 22B. In place of these lifting lugs is shown a single transverse lifting lug 41. Other elements of this embodiment are similar to analogous elements in the embodiment of FIG. 1 and the numerals have not been shown for the sake of clarity.

A vacuum filter (not shown) may be provided in channel 33; see FIG. 2. This vacuum filter is conveniently made from sintered metal.

We claim:

1. A clamping device for temporarily attaching a tool to a surface of an article, comprising:

(a) a base plate having a lower surface;

(b) a groove formed in the lower surface and extending around the periphery of the base plate, the groove being defined by a bottom face, an inwardly facing side face and an outwardly facing side face, the side faces each extending from the bottom face to the lower surface of the base plate;

(c) a compressible seal having side faces located in the groove and protruding externally therefrom, the lower surface and compressible seal defining a vacuum chamber together with the article surface when the base plate is pressed toward the article surface in use of the clamping device, the compressible seal being dimensioned relative to the groove so that, and when sealing against the article surface, the seal deforms laterally within the groove to sealingly engage against both the side faces, and also deforms laterally externally of the groove to sealingly engage against the lower surface immediately adjacent the groove, deformation of the seal improving its airtight qualities and restricting the seal against inward and outward lateral movement relative to the base plate thereby stabilizing the base plate of the article;

(d) at least one protrusion on the lower surface of the base plate, the protrusion projecting a non-adjustable distance from the lower surface, which distance is less than a distance the compressible seal protrudes from the groove when undeformed, the protrusion engaging the article surface upon deformation of the compressible seal to thereby limit the extent of seal deformation and further stabilize the base plate on the article; and (e) a means to supply a vacuum to the vacuum chamber.

2. The clamping device as claimed in claim 1, wherein the base plate is provided with a degree of flexibility such that its lower surface may be adjusted to adhere to an irregular surface.

3. A clamping device as claimed in claim 1, wherein the seal may move to a substantial degree from outside to the inside of the groove to assist in conforming the seal to roughnesses on the surface of the article to be grasped or worked upon.

4. A clamping device as claimed in claim 1, wherein the seal is adhered to the bottom face of the groove.

5. A clamping device as claimed in claim 1, wherein a vacuum generating device is provided in combination with the remainder of the clamping device.

6. A clamping device as claimed in claim 1, wherein a separate source of vacuum is provided.

7. The clamping device of claim 1, further including a tool attached to the base plate wherein the tool is located for simultaneous operation of the tool and the clamping device.

8. A clamping device as claimed in claim 1, wherein the groove tapers away from the lower surface of the base plate to grip the compressible seal.

* * * * *

UNITED STATES PATENT AND TRADEMARK OFFICE
CERTIFICATE OF CORRECTION

PATENT NO. : 5,681,022
DATED : October 28, 1997
INVENTOR(S) : Noel William George Rankin It is certified that error appears in the above-indentified patent and that said Letters Patent is hereby corrected as shown below:

Column 6, line 9, after "that" insert -- in its incompressed state a portion of each of said side faces of said groove is spaced from an outer corresponding side portion of each of said side faces of said compressible seal --;

line 9, before "when" insert -- and --.

Signed and Sealed this

Tenth Day of March, 1998

Attest:

BRUCE LEHMAN

*Attesting Officer*  *Commissioner of Patents and Trademarks*